United States Patent Office 3,833,582
Patented Sept. 3, 1974

3,833,582
HERBICIDAL 1H-PYRAZOLO[3,4-d]PYRIMIDIN-4-ONES
Beryl W. Dominy, Groton, Conn., assignor to Pfizer Inc., New York, N.Y.
No Drawing. Filed Aug. 21, 1972, Ser. No. 282,383
Int. Cl. C07d 51/46
U.S. Cl. 260—256.4 F                  7 Claims

ABSTRACT OF THE DISCLOSURE

Herbicidal 1H-pyrazolo[3,4]pyrimidin-4-ones of the formulae

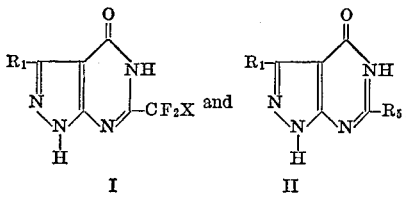

or the alkali metal, ammonia, mono-, di- and trialkylamine salts thereof, wherein each of the alkyl groups has from 1 to 12 carbon atoms, wherein X is hydrogen, chloro, fluoro and $CR_2R_3R_4$ wherein each of $R_2$, $R_3$ and $R_4$ is hydrogen, chloro and fluoro; $R_1$ is hydrogen and alkyl of from 1 to 4 carbon atoms; and $R_5$ is alkyl of from 3 to 5 carbon atoms.

BACKGROUND OF THE INVENTION

This invention relates to a series of 1H-pyrazolo[3,4-d]pyrimidin-4-ones useful as herbicides.

Weeds, which can be broadly defined as any undesirable plants, cause considerable economic losses annually and are also objectionable for aesthetic reasons. Considerable effort is expended annually in removing and controlling the growth of weeds along highways, railway beds, and in parks and gardens. Of most concern, however, is their interference with the growth of agricultural crops, thereby increasing the cost of producing these crops. Weeds are generally eliminated mechanically, such as by actual physical removal from the ground, or by means of chemicals. Initially, the chemicals used for weed control were inorganic compounds; in particular, the chlorates, chlorides and arsenites. These compounds are usually nonselective herbicides and kill all living plants. In the 1940's, attention was directed to more selective herbicides which would only destroy undesirable plants and cause little damage to agricultural crops. Most of these new herbicides were organic compounds and the first one developed, 2,4-D (2,4-dichlorophenoxyacetic acid) and its derivatives, is still widely used today for weed control.

In the interest of economy and selectivity, many other prototype organic structures have been examined for herbicidal activity. A limited series of quinazolines including 4-ethylamino-, 4-diethylamino-, 2-chloro-4-ethylamino and 2 - chloro - 4-diethylaminoquinazoline are claimed as plant-growth regulators (British Pat. No. 822,069). In 1964-65 Deysson et al., Compt. Rend. 259 (2), 479 (1964); Ann. Pharm. Franc. 23, 163, 229 (1965) reported the antimitotic properties of 1-methyl-1,4-dihydro, 1 - propyl-1,4-dihydro-, 3-methyl-3,4-dihydro-, 3-ethyl,3,4-dihydro, 3-propyl-3,4-dihydro-, and 3-isopropyl-3,4-dihydro-4-quinazolones. U.S. Pat. 3,244,503 discloses a series of 3-alkyl and cycloalkyl substituted 2,4(1H, 3H)-quinazolinediones, useful as herbicides.

F. I. Abezqauz et al., Zh. Obshch. Khim. 34 (9), 2965 (1964), (C.A. 61, 15996g), describes the synthesis of 2-fluoromethylquinazol-4-one; and Dymek et al., Dissertationes Pharm. 16 (3), 247 (1964), (C.A. 63, 11561c), the corresponding 2-chloromethyl analog. In both cases, no utility was disclosed.

R. F. Smith et al., J. Org Chem. 30, 1312 (1965) describes the chlorination of 2-methyl- and 2-ethylquinazol-4-one employing a phosphorous tri- and pentachloride mixture wherein 2-trichloromethyl- and 2-(1,1-dichloroethyl)-4-chloroquinazoline are formed, respectively. W. L. Armarego et al., J. Chem. Soc., 234 (1966) reports the preparation of a limited number of substituted quinazolines including the 2 - trifluoromethyl analog thereof. Both groups of investigators failed to disclose a specific utility for their compounds.

More recently Japanese Pat. 7,124,029 claims a series of 1-substituted-4(1H)-quinazolinones as antitussive, antirheumatic and antiinflammatory agents while Japanese Pat. 7,124,030 claims 2,3-disubstituted-4(3H)-quinazolinones as tranquillizers, anticonvulsants and hypotensives. French Specification 2,098,361, published Mar. 10, 1972, describes a series of 2-polyfluoroalkyl - 4 - quinazolines of use as pre- and post-emergence herbicides.

Belgian Pat. 765,533, granted Aug. 30, 1971, describes a series of 3,6 - disubstituted-5-H-isoxazolo[5,4-d]pyrimidine-4-ones which are useful as herbicides.

Cheng et al., J. Org. Chem. 23, 191–200 (1958) report the synthesis of 1H-4-hydroxy-6-alkylpyrazolo[3,4-d]pyrimidines which, at low doses, inhibit growth of certain fungi, but at larger doses support fungal growth. Inoue et al., J. Med Chem. 7, 816–818 (1964) describes 1H-4-substituted - 6-trifluoromethylpyrazolo[3,4-d]pyrimidines, including 1H-4-hydroxy-6-trifluoromethylpyrazolo[3,4-d]pyrimidines but failed to specify a utility for the compounds.

A limited series of 1-isopropyl-6-alkyl-4-hydroxypyrazolo[3,4-d]pyrimidines useful as coronary dilators is described in German Pat. 1,156,415. Analogous 1-isopropyl-6-alkyl-4-mercaptopyrazolo[3,4-d]pyrimidines, their synthesis and use as coronary dilators are reported in Swiss Pats. 396,923 and 396,924, respectively. The synthesis of a number of 1H - 4-hydroxypyrazolo[3,4-d]pyrimidines which may be substituted at any one of the 1-, the 3- or the 6-positions is presented in German Pat. 1,153,023.

A variety of pyrazolo[3,4-d]pyrimidines were prepared by Cheng et al., J. Org. Chem., 21, 1240–1256 (1961) and by Robins, J. Am. Chem. Soc. 78, 784–790 (1956) as potential purine antagonists. German Pat. 1,149,013 describes the synthesis of and the vasodilating properties of a series of 4-oxo-4,5-dihydropyrazolo[3,4-d]pyrimidines.

Compounds of formula I, with the exception of 1H-4-hydroxy-6-trifluoromethylpyrazolo[3,4-d]pyrimidine and those of formula II are new compounds.

SUMMARY OF THE INVENTION

It has now been found that certain 1H-pyrazolo[3,4-d]pyrimidin-4-ones selected from the group consisting of those having the formulae

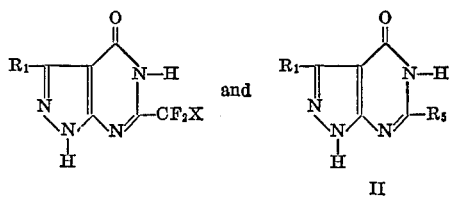

the alkali metal, ammonia, mono-, di- and trialkylamine salts thereof wherein each of the alkyl groups has from 1 to 12 carbon atoms, wherein $R_1$ is selected from the group consisting of hydrogen and alkyl having from 1 to 4 carbon atoms; X is selected from the group consisting of hydrogen, chloro, fluoro and $CR_2R_3R_4$; each of $R_2$, $R_3$ and $R_4$ is selected from the group consisting of hydrogen, chloro and fluoro; and $R_5$ is alkyl having from 3 to 5 carbon atoms, are effective pre- and post-emergence herbicides.

Although the compounds are represented above in the keto form it is recognized that they can also exist as the tautomeric 4-hydroxy derivatives. Therefore, embraced within this invention are both forms of the compounds of formulae I and II above.

Compounds of formula I are generally favored over those of formula II because of their greater and broader range of herbicidal activity. The preferred compounds are those of formula I wherein X is fluoro or —$CF_3$ and $R_1$ is alkyl of from 1 to 4 carbon atoms and those of formula II wherein $R_5$ is t-butyl and $R_1$ is alkyl of from 1 to 4 carbon atoms.

As noted above, the compounds described herein are effective as pre-emergence and/or post-emergence herbicides. They are thus useful in controlling the growth of weeds by treating the soil before the emergence of the weeds with an herbicidal amount of one or more of such compounds to prevent germination of seeds in the soil (pre-emergence), and/or by treating the growing weeds with an herbicidal amount of one or more of the compounds of this invention.

DETAILED DESCRIPTION OF THE INVENTION

The compounds of this invention are prepared from the appropriate 5 - amino - 4 - cyano pyrazoles or 5 - amino-4-pyrazolecarboxamides by acylation thereof with the appropriate organic acid anhydride ($CF_2X$—$CO)_2O$ or ($R_5CO)_2O$ or a mixture of the anhydride and the corresponding acid. The acylation is accomplished by reacting the pyrazole compound with at least a stoichiometric amount, and generally with an excess, of the acylating agent which serves both as reactant and solvent. Alternatively, the acylation is conducted in a reaction-inert solvent, such as N,N-dimethylformamide, using an equimolar amount or a slight excess of the acylating agent. A solvent is beneficial in those instances wherein the pyrazole is not soluble, or is difficultly soluble in the acylating agent. The acylation is carried out at a temperature of from about room temperature to the reflux temperature of the solvent system for periods of from about 0.5 to 5 hours. The acylated products are recovered by known methods as, for example, by evaporation of the solvent or by precipitation of the product from the reaction mixture with a non-solvent; that is, a solvent in which the product is of low solubility.

The acylated products are then cyclized to the corresponding pyrazolo[3,4-d]pyrimidin-4-ones by any one of several methods. Thermal cyclization affords a convenient method when using an acylated 5-amino-4-pyrazolecarboxamide as reactant. The procedure comprises heating the acylated 5-amino-4-pyrazolecarboxamide at an elevated temperature; i.e., from about 150° to about 300° C. for periods of from about 0.5 to about 4 hours. The thermal cyclization can be conducted in the absence or presence of a suitable liquid to permit formation of a solution or slurry of the pyrazole compound. Suitable liquids are high-boiling reaction-inert substances, such as mineral oil, diphenyl ether and N,N'-dimethylformamide. The cyclized product is recovered by appropriate means, e.g., by extraction of the melt with a suitable solvent, or by filtration of the reaction-inert liquid and extraction of the residue and by other methods known to those skilled in the art.

Alternatively, cyclization of the acylated 5-amino-4-pyrazolecarboxamide reactants is accomplished by heating in aqueous alkali (sodium or potassium hydroxide). Alkali concentrations of from about 5% to about 10% and temperatures of from about 70° to 80° C. have proved satisfactory. Higher or lower temperatures can be used but appear to offer no advantage. The molar ratios of pyrazole compound to alkali are of the same order as is discussed below for cyclization of 5-amino-4-cyanopyrazoles.

Cyclization of the acylated 5-amino-4-cyanopyrazoles is readily accomplished in aqueous alkali to which hydrogen peroxide is added. Aqueous alkali, e.g., 5–10% sodium or potassium hydroxide, containing twice its volume of 3% hydrogen peroxide is well suited for this cyclization. The ratios of reactants are, however, not critical but can range from about equimolar to ratios of pyrazole: alkali:hydrogen peroxide of 1:2:4. Satisfactory results are achieved with molar ratios of about 1:1.5:2. The reaction is conducted at from about 10° C. to about 50° C. for up to two hours. The product is recovered by acidification of the reaction mixture.

The required 3 - alkyl - 5 - amino - 4 - pyrazolecarboxamides are prepared according to the procedure reported by Cheng et al., J. Org. Chem. 21, 1240–1256 (1956) for the preparation of 5 - amino - 3 - methyl - 4 - pyrazolecarboxamide. The procedure comprises reaction of the appropriate alkylethoxymethylenemalononitrile with hydrazine to give the corresponding 3 - alkyl - 5 - amino - 4 - cyanopyrazole which is subsequently hydrolyzed by treatment with sulfuric acid to the corresponding 4-carboxamide derivative.

The alkylethoxymethylenemalononitriles are prepared from malononitrile, the appropriate triethyl orthoalkanoate, e.g., trimethyl or triethyl orthopropionate, butyrate and valerate, and alkanoic acid anhydride corresponding to the acid of the triethyl orthoalkanoate as described by Cheng et al., (loc. cit.) for methylethoxymethylenemalononitrile.

Except for the salts, the compounds of the present invention are only slightly water-soluble. For post-emergence application, it is necessary that the herbicides penetrate the waxy integument that covers the surface parts of the weeds. Consequently, it is preferred not to use the water-soluble salts for post-emergence application since these compounds will easily wash off the surface of the weeds. The water-insoluble organic compounds or their cyclohexylamine, dicyclohexylamine and alkylamine salts, on the other hand, more readily penetrate the waxy integument and are, therefore, preferred for post-emergence application. The term alkylamine as employed in the instant invention is meant to encompass mono-, di- and trialkylamines wherein the alkyl portion contains from 1 to 12 carbon atoms. Monoalkylamines substituted by one or two cyclohexyl groups and containing from 1 to 12 carbon atoms in the alkyl portion are also included. The preferred alkylamine salts include those formed from dodecylamine, dimethylamine and N,N-dimethyldodecylamine.

Because of the need to penetrate the waxy plant integument, it is generally preferred to apply the water-insoluble compounds or their alkylamine salts of the present invention in the form of a lipophilic phase. This can be readily accomplished by dissolving these compounds or their alkylamine salts in water-immiscible organic solvents such as xylene, kerosene or heavy aromatic naphthas, and applying the resultant solutions directly to the weeds. It is frequently desirable to employ isophorone or isopropanol as co-solvents. Alternatively, under certain circumstances, it might be desirable to employ aqueous emulsions or dispersions of these water-immiscible solutions.

For pre-emergence application it is, of course, necessary that the herbicides persist in the soil for a period of time. For this reason, simple water-soluble compounds would not be very effective. However, it has been found that substantial amounts of the water-soluble salts of the compounds of the present invention, after a period of time, will hydrolyze to the water-insoluble free acid form upon contact with the soil. Accordingly, aqueous solutions of the salts of the present invention can be conveniently used for pre-emergence application. The preferred salts for the aforementioned use include the alkali metal salts, especially the sodium and potassium salts.

For both pre- and post-emergence application, the compounds of the present invention or the aforementioned salts thereof may be applied directly or in the form of solutions, suspensions, emulsions, wettable powders (plus oil), flowable powders, dusts, sprays or aerosols. Solutions of the water-soluble compounds or their salts may be prepared from the aforementioned hydrocarbon solvents and such co-solvents as alkanols and ketones. Suspensions or dispersions of the compounds can readily be prepared by suspending the compounds in water with the aid of wetting or dispersing agents, such as the Tweens (polyoxyalkylene derivatives of sorbitan monolaurate) or, alternatively, by dissolving them in a suitable solvent which can then be dispersed in water.

The compounds can also be applied as powders or dust by mixing them or milling them with such inert carriers as talc, diatomaceous earth, Fuller's earth, kaolin and various other clays. Aerosols containing the compounds of the present invention can also be prepared.

For pre-emergence herbicides, the dosage level will vary from ¼ to 10 pounds per acre, the exact amount depending upon the compound under consideration and the particular weed. For post-emergence herbicides, application on a level of ⅛ to 5 pounds per acre is usually adequate.

The following examples are provided to illustrate further the scope of the present invention and should not be construed as limitations thereof.

EXAMPLE I 1H-6-Perfluoroethylpyrazolo[3,4-d]Pyrimidine-4-One (Cpd. 1)

(A) 5-Perfluoroacetamido-4-pyrazolecarboxamide: A slurry of 5-amino-4-pyrazolecarboxamide (5.0 g.) and the anhydride of perfluoropropionic acid (one equivalent) was refluxed for two hours. N,N-dimethylformamide (2 ml.) was then added to facilitate solution of the reactants and the mixture refluxed for an additional hour and then cooled. Diethyl ether (50 ml.) was added and the resulting precipitate recovered by filtration and dried (3 g.). It was identified as mostly starting material by its infrared spectrum.

The filtrate was allowed to stand overnight and the precipitate which formed filtered off and dried (3.5 g.). It was a yellow solid melting at about 105° C. and identified by infrared as 5-perfluoroacetamido-4-pyrazolecarboxamide.

(B) Cyclization Reaction: 5-Perfluoroacetamido-4-pyrazole carboxamide (3.0 g.) was heated at 200° C. (oil bath) for one hour. The solid was then cooled and triturated with ethanol. The ethanol phase was separated by filtration and evaporated to dryness to give the product as a white solid (900 mg.); M.P. 293–295° C.

Repetition of the above procedures but using the appropriate 5-amino-4-pyrazolecarboxamide and the appropriate acid anhydride $(CF_2X—CO)_2O$ afforded the following compounds:

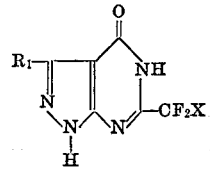

| Compound: | $R_1$ | X | M.P. (° C.) |
|---|---|---|---|
| 2 | H | F | 317–319 |
| 3 | $CH_3$ | F | 326–328 |
| 4 | $CH_3$ | Cl | 308–310 |
| 5 | H | H | 289 |

EXAMPLE II

The following compounds are prepared from appropriate 5-amino-4-pyrazolecarboxamides of the formula

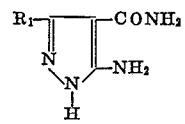

and fluoroalkanoic acid anhydrides of the formula $$(X—CF_2—CO)_2O$$

wherein $R_1$ and X are as defined above according to the procedure of Example I to give the compounds below:

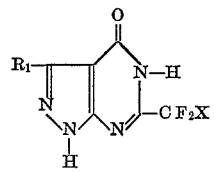

| $R_1$ | X | $R_1$ | X | $R_1$ | X | $R_1$ | X |
|---|---|---|---|---|---|---|---|
| H | Cl | $CH_3$ | H | $C_2H_5$ | $CH_3$ | n-$C_3H_7$ | CH(Cl)F |
| H | $CH_3$ | $CH_3$ | $CH_3$ | $C_2H_5$ | $CHF_2$ | n-$C_3H_7$ | $C(Cl)_2F$ |
| H | $CH_2F$ | $CH_3$ | $CH_2F$ | $C_2H_5$ | $CF_3$ | i-$C_3H_7$ | H |
| H | $CHF_2$ | $CH_3$ | $CHF_2$ | $C_2H_5$ | $CHCl_2$ | i-$C_3H_7$ | Cl |
| H | $CF_3$ | $CH_3$ | $CF_3$ | $C_2H_5$ | $CCl_3$ | i-$C_3H_7$ | F |
| H | $CH_2Cl$ | $CH_3$ | $CHCl_2$ | n-$C_3H_7$ | H | i-$C_3H_7$ | $CF_3$ |
| H | $CHCl_2$ | $CH_3$ | $CCl_3$ | n-$C_3H_7$ | Cl | i-$C_3H_7$ | $CCl_3$ |
| H | $CCl_3$ | $CH_3$ | $C(Cl)F_2$ | n-$C_3H_7$ | F | i-$C_3H_7$ | $CHF_2$ |
| H | $C(Cl)F_2$ | $C_2H_5$ | H | n-$C_3H_7$ | $CH_3$ | n-$C_4H_9$ | H |
| H | $C(Cl)_2F$ | $C_2H_5$ | Cl | n-$C_3H_7$ | $CF_3$ | n-$C_4H_9$ | Cl |
| H | CH(Cl)F | $C_2H_5$ | F | n-$C_3H_7$ | $CCl_3$ | n-$C_4H_9$ | F |
| n-$C_4H_9$ | $CF_3$ | n-$C_4H_9$ | $C(Cl)F_2$ | n-$C_4H_9$ | $CCl_3$ | n-$C_4H_9$ | $CH_2Cl$ |
| Sec-$C_4H_9$ | H | Sec-$C_4H_9$ | Cl | Sec-$C_4H_9$ | F | Sec-$C_4H_9$ | $CF_3$ |
| Sec-$C_4H_9$ | $CCl_3$ | Sec-$C_4H_9$ | CH(Cl)F | Sec-$C_4H_9$ | $C(Cl)F_2$ | | |

EXAMPLE III 1H-6-Methylpyrazolo[3,4-d]Pyrimidin-4-One (A) 5-Acetamido-4-Pyrazolecarboxamide: A mixture of 5-amino-4-pyrazolecarboxamide (5.0 g.) and acetic anhydride (15 ml.) is refluxed for ten hours and the excess anhydride then distilled off under reduced pressure. Diethyl ether (50 ml.) is added to the residue and the resulting solid filtered and dried.

(B) Cyclization Process: 5-Acetamido-4-pyrazolecarboxamide (3.0 g.) is heated at 200° C. (oil bath) for one hour, and then cooled and triturated with ethanol. The ethanol solution is separated and evaporated to dryness to give the title product.

In like manner, the following compounds are prepared from appropriate reactants:

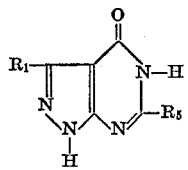

| $R_1$ | $R_5$ | $R_1$ | $R_5$ | $R_1$ | $R_5$ | $R_1$ | $R_5$ |
|---|---|---|---|---|---|---|---|
| H | i-$C_3H_7$ | $CH_3$ | i-$C_3H_7$ | $C_2H_5$ | i-$C_3H_7$ | i-$C_3H_7$ | t-$C_4H_9$ |
| H | n-$C_4H_9$ | $CH_3$ | n-$C_4H_9$ | $C_2H_5$ | n-$C_4H_9$ | n-$C_4H_9$ | n-$C_3H_7$ |
| H | i-$C_4H_9$ | $CH_3$ | Sec-$C_4H_9$ | $C_2H_5$ | t-$C_4H_9$ | n-$C_4H_9$ | n-$C_4H_9$ |
| H | t-$C_4H_9$ | $CH_3$ | t-$C_4H_9$ | n-$C_3H_7$ | n-$C_3H_7$ | n-$C_4H_9$ | t-$C_4H_9$ |
| $CH_3$ | n-$C_3H_7$ | $C_2H_5$ | n-$C_3H_7$ | n-$C_3H_7$ | t-$C_4H_9$ | t-$C_4H_9$ | t-$C_4H_9$ |
| H | n-$C_5H_{11}$ | $CH_3$ | n-$C_5H_{11}$ | n-$C_4H_9$ | n-$C_5H_{11}$ | H | Neo-$C_5H_{11}$ |
| H | i-$C_5H_{11}$ | $C_2H_5$ | t-$C_5H_{11}$ | H | t-$C_5H_{11}$ | n-$C_3H_7$ | Neo-$C_5H_{11}$ |

EXAMPLE IV 1H-6-Trifluoromethylpyrazolo[3,4-d]Pyrimidin-4-One (A) 5 - Trifluoroacetamido - 4 - Cyanopyrazole: A mixture of 5-amino-4-cyanopyrazole (5.0 g.), trifluoroacetic anhydride (two equivalents) and N,N-dimethylformamide (2 ml.) is refluxed for two hours. The reaction mixture is cooled and diethyl ether (50 ml.) added. The solid which precipitates is filtered off and the filtrate allowed to stand overnight. The precipitate which forms is filtered and dried. It is identified as the acylated product by its infrared spectrum.

(B) Cyclization (Aqueous KOH and $H_2O_2$): The acylated product (5.0 g.) prepared according to A above is dissolved in a solution of potassium hydroxide (2 g.) and 3% hydrogen peroxide (80 ml.) and the mixture warmed to 70°–80° C. for five hours. It is then acidified with glacial acetic acid to precipitate the cyclized product.

The following compounds are prepared in this manner from appropriate 5-amino-4-cyanopyrazoles, and acid anhydrides of the formula ($R_5'$—CO)$_2$O wherein $R_5'$ is $CF_2X$— or $R_5$ wherein X and $R_5$ are as defined above.

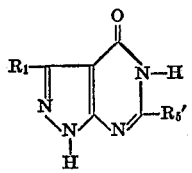

| $R_1$ | $R_5'$ | $R_1$ | $R_5'$ |
|---|---|---|---|
| H | $CF_2$—$CH_3$ | n-$C_3H_7$ | $CF_3$ |
| H | $CF_2$—$CH_2F$ | n-$C_3H_7$ | $CF_2$—$CF_3$ |
| H | $CF_2$—$CF_2H$ | n-$C_3H_7$ | $CF_2$—$CCl_3$ |
| $CH_3$ | $CF_3$ | n-$C_3H_7$ | $CF_2$—Cl |
| $CH_3$ | $CF_2$—Cl | n-$C_4H_9$ | $CF_2CH_3$ |
| $CH_3$ | $CF_2$—$CF_3$ | n-$C_4H_9$ | $CF_3$ |
| $CH_3$ | $CF_2$—$CHF_2$ | n-$C_4H_9$ | $CF_2$—$CF_3$ |
| $C_2H_5$ | $CF_2$—$CF_3$ | i-$C_3H_7$ | $CF_3$ |
| $C_2H_5$ | $CF_3$ | Sec-$C_4H_9$ | $CF_2CF_3$ |
| H | t-$C_4H_9$ | n-$C_4H_9$ | t-$C_4H_9$ |
| $CH_3$ | t-$C_4H_9$ | n-$C_4H_9$ | n-$C_3H_7$ |
| $C_2H_5$ | i-$C_3H_7$ | n-$C_4H_9$ | t-$C_4H_9$ |

EXAMPLE V

Ammonium Salt of 1H-6-Perfluoroethylpyrazolo[3,4-d]Pyrimidin-4-One

To a solution of ammonia (10 ml. of 3.8N) is added 1H - 6-perfluoroethylpyrazolo[3,4-d]pyrimidin-4-one (5.0 g.) and the mixture stirred for two hours. It is then evaporated under reduced pressure to give the title product.

EXAMPLE VI 1H-6-Trifluoromethylpyrazolo[3,4-d]Pyrimidin-4-One Triethylamine Salt Triethylamine (4 ml.) is added to a solution of 1H-6-trifluoromethylpyrazolo[3,4-d]pyrimidin-4-one (5.0 g.) in warm methanol (150 ml.), the mixture stirred for one hour and then evaporated to dryness under reduced pressure to give the product.

EXAMPLE VII 1H-6-Difluoromethylpyrazolo[3,4-d]Pyrimidin-4-One N,N-Dimethyldodecylamine Salt N,N-Dimethyldodecylamine (6.40 g.) is added to a solution of 1H-6-difluoromethylpyrazolo[3,4-d]pyrimidin-4-one (3.72 g.) in warm methanol (150 ml.). The mixture is stirred for one hour and then evaporated under reduced pressure to give the product.

EXAMPLE VIII

Following the procedure of Examples V–VII but using the appropriate amine or ammonia, the remaining products of Examples I–IV are converted to the following salts:

ammonia
triethylamine
n-butylamine
n-octylamine
dodecylamine
dimethylamine
methylisopropylamine
di-n-hexylamine
N-methyldodecylamine
N,N-diethylmethylamine
N,N-didodecylmethylamine
N,N-dimethylcyclohexylamine
Dicyclohexylamine
N-n-butylcyclohexylamine
N-n-octyldicyclohexylamine
N-isodecyldidodecylamine

EXAMPLE IX 1H-6-Perfluoroethylpyrazolo[3,4-d]Pyrimidin-4-One Sodium Salt

To 1H-6-perfluoroethylpyrazolo[3,4-d]pyrimidin-4-one (5.0 g.) in water (100 ml.), sufficient 0.5 N sodium hydroxide is added with stirring to provide a solution of pH 8.5. A small amount of particulate matter is filtered off and the filtrate evaporated to dryness under reduced pressure to a white solid. The solid is triturated with chloroform and dried.

In like manner, the sodium, potassium and lithium salts of the compounds of Examples I–IV are prepared.

EXAMPLE X

The pre-emergence and post-emergence herbicidal activity of typical representatives of the compounds of the present invention are set forth below, together with the test procedures.

Test Procedures

Pre-emergence: Appropriate weed species are seeded in individual, disposable four-inch square containers and watered only in amounts adequate to moisten soil. The samples are stored for twenty-four hours before treatment.

Post emergence: The weed species are seeded by growth-time requirement schedules in individual, disposable four-inch square containers, watered as required, and maintained under greenhouse conditions. When all the weeds have reached suitable growth development, generally first true leaf stage, those appropriate to pertaining test requirements are selected for uniformity of growth and development. One four-inch container of each weed, averaging up to fifty or more weeds per individual container, is then placed on a carrying tray for treatment. Generally, eight weed containers are used in each evaluation.

Formulation and Treatment: The candidate compounds are dissolved in acetone or other suitable solvent and, as appropriate, diluted in water-containing wetting and emulsifying agents.

One carrying tray each of pre-emergence and post-emergence containers, mounted on a conveyer belt of 1.5 m.p.h. linear speed, trips a microswitch which in turn activates a solenoid valve and releases treatment. Candidate compounds are discharged as sprays at a rate of forty gallons (adjustable) per acre and thirty pounds (adjustable) pressure. Pre-emergence and post-emergence treatments are removed to the greenhouse and held for observation.

2,4-D (2,4-dichlorophenoxyacetic acid) is used as reference standard.

Observations: Pre-emergence and post-emergence treatments are observed daily for interim response, final observations being made twelve to twenty-one days after treatment. Any treatments inducing questionable response are held beyond this observation period until such responses can be confirmed.

Observations include all abnormal physiological responses of stem bending, petiole curvature, epinasty, hyponasty, retardation, stimulation, root development, necrosis and related growth regulant characteristics.

The results are listed in the following tables. The compounds of the present invention are particularly effective against deep and/or shallow germinating broadleaf annual weeds, such as Wild Morning Glory (MNGY), a weed especially troublesome in the cultivation of the soybean plant.

The compound numbers in the tabulations correspond to the numbers assigned the compounds in the preceding examples.

Pre-emergence

| Compound: | Lbs./acre | Day | BNGS | MNGY | MSTD | JMWD | QKGS | YLFX | CBGS |
|---|---|---|---|---|---|---|---|---|---|
| 1 | 10 | 14 | 4:RNe | 2:R | 2:R | 0:0 | 4:RNe | 0:0 | |
|   | 10 | 21 | 3:RNe | 5:RDNe | 4:Ne | 0:0 | 3:RNe | 2:R | |
| 2 | 10 | 21 | 8:RNe | 10:RNe | 10:RNe | 2:R | 7:RNe | 10:Ne | |
|   | 5 | 21 | 6:RNe | 5:RNe | 10:RNe | 1:R | 6:RNe | 10:Ne | |
|   | 2.5 | 21 | 4:RNe | 5:RNe | 9:RNe | 1:R | 5:R | 10:Ne | |
|   | 10 | 14 | 7:RNe | 6:RNe | 9:RNe | 0:0 | 6:RNe | 10:Ne | |
|   | 5 | 14 | 6:RNe | 5:RNe | 8:RNe | 0:0 | 3:R | 9:RNe | |
|   | 2.5 | 14 | 4:RNe | 4:RNe | 7:RNe | 0:0 | 2:R | 8:RNe | |
| 3 | 10 | 14 | 4:RNe | 8:RNe | 6:RNe | 0:0 | 2:R | 0:0 | |
|   | 5 | 14 | 4:RClNe | 8:RNe | 8:RNe | 0:0 | 4:RNe | 2:R | |
|   | 2 | 14 | 2:R | 5:RNe | 8:RNe | 0:0 | 8:RNe | 0:0 | |
|   | 1 | 14 | 0:0 | 2:R | 7:RNe | 0:0 | 0:0 | 0:0 | |
|   | 10 | 21 | 7:NeCl | 10:Ne | 10:Ne | 9:Ne | 2:R | 0:0 | |
|   | 5 | 21 | 5:RClNe | 10:Ne | 10:Ne | 8:RNe | 4:RNe | 3:R | |
|   | 2 | 21 | 0:0 | 5:RNe | 9:RNe | 2:RNe | 0:0 | 0:0 | |
|   | 1 | 21 | 0:0 | 2:RCl | 7:RNe | 0:0 | 0:0 | 0:0 | |
| 4 | 10 | 12 | 6:RA | 7:RNe | 9:RNe | 8:R | 6:RNe | 6:RA | |
|   | 10 | 19 | 7:RA | 8:RNe | 10:RNe | 10:RNe | 5:RNe | 5:RNe | |
| 5 | 10 | 13 | 0:0 | 0:0 | 0:0 | 0:0 | 0:0 | 0:0 | |

Post-emergence

| | Lbs./acre | Day | BNGS | MNGY | MSTD | JMWD | QKGS | YLFX | CBGS |
|---|---|---|---|---|---|---|---|---|---|
| 1 | 10 | 14 | 4:Ne | 4:Ne | 10:Ne | | 2:Ne | 9:Ne | |
| 2 | 10 | 14 | 8:RNe | 9:Ne | 10:Ne | | 9:RNe | 9:RNe | |
|   | 5 | 14 | 5:RNe | 7:RCWe | 10:Ne | | 9:RNe | 9:RNe | |
|   | 2.5 | 14 | 4:RNe | 5:RNe | 10:Ne | | 5:RNe | 8:RNe | |
| 3 | 10 | 14 | 4:RNe | 10:Ne | 10:Ne | | 0:0 | 9:RNe | |
|   | 5 | 14 | 0:0 | 10:Ne | | | 0:0 | | |
|   | 2 | 14 | 0:0 | 9:Ne | | | 0:0 | | |
|   | 1 | 14 | 0:0 | 9:Ne | | | 0:0 | | |
| 4 | 10 | 14 | 1:Ne | 9:Ne | | | 3:Ne | | |
| 5 | 10 | 13 | 1:Ne | 3:Ne | | | 1:Ne | | |

Plants (annual weeds):
  BNGS = Barnyard grass
  MNGY = Wild morning glory
  MSTD = Mustard
  JMWD = Jimson weed
  YLFX = Yellow foxtail
  CBGS = Crab grass
  QKGS = Quackgrass Plant injury and response:
  R = Retarded or reduced
  Ne = Necrosis
  Cl = Chlorosis
  A = Albinism NOTE.—Herbicidal numerical injury rating: 0 (no injury) to 10 (all plants killed).

What is claimed is:

1. A compound selected from the group consisting of those having the formula

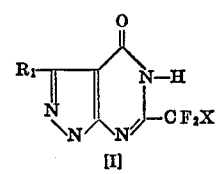

and the alkali metal, ammonia, mono-, di- and trialkylamine, dicyclohexylamine, N-cyclohexylalkylamine, and N,N-dicyclohexylalkylamine salts thereof wherein each alkyl has 1 to 12 carbon atoms, wherein $R_1$ is selected from the group consisting of hydrogen and alkyl having 1 to 4 carbon atoms and X is selected from the group consisting of hydrogen, chloro, fluoro and $—CR_2R_3R_4$ wherein each of $R_2$, $R_3$ and $R_4$ is selected from the group consisting of hydrogen, chloro and fluoro with the proviso that when X is fluoro, $R_1$ is alkyl having from 1 to 4 carbon atoms.

2. A compound according to claim 1, wherein X is fluoro; and $R_1$ is alkyl having from 1 to 4 carbon atoms.

3. A compound according to claim 1, wherein X is —$CR_2R_3R_4$ wherein each of $R_2$, $R_3$ and $R_4$ is fluoro; and $R_1$ is alkyl having from 1 to 4 carbon atoms.

4. A compound according to claim 1, wherein $R_1$ is alkyl having from 1 to 4 carbon atoms; and X is chloro.

5. A compound according to claim 2 wherein X is fluoro; and $R_1$ is methyl.

6. A compound according to claim 3 wherein X is —$CF_3$, and $R_1$ is methyl.

7. A compound according to claim 4 wherein $R_1$ is methyl; and X is chloro.

References Cited

FOREIGN PATENTS

7005555  10/1970  Netherlands.

OTHER REFERENCES

Cresswell et al., C.A. 72, 132769d (1970).

RAYMOND V. RUSH, Primary Examiner

U.S. Cl. X.R.

71—92